(No Model.)
G. MARTIN.
HORSESHOE.
No. 480,731. Patented Aug. 16, 1892.
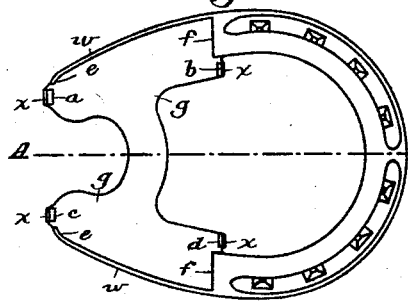
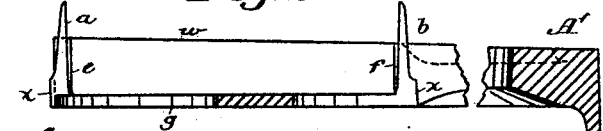
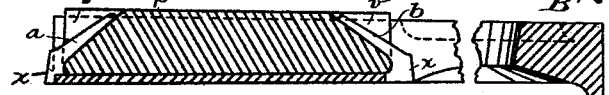
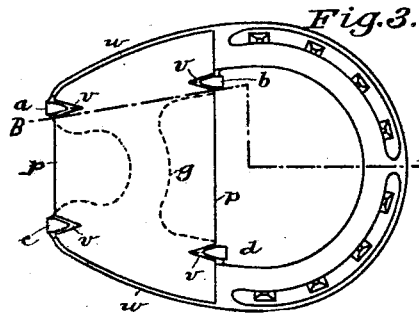
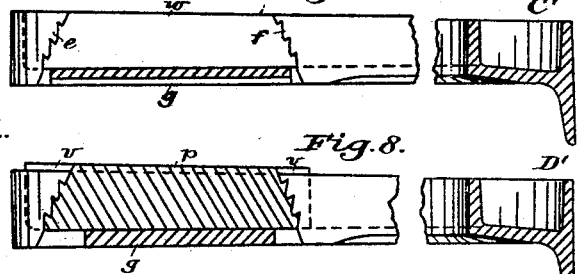
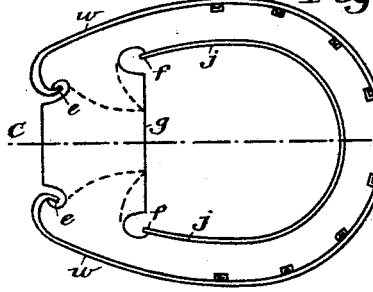
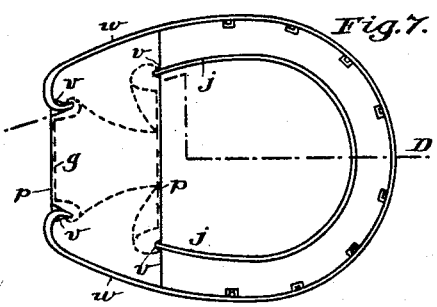
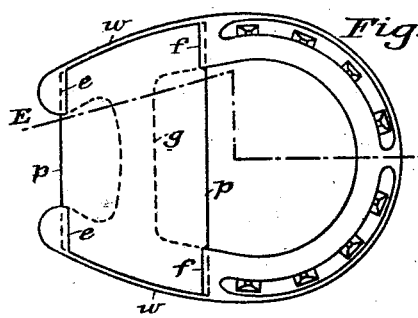
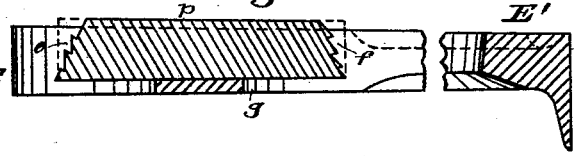
Witnesses:
E. B. Botton
H. S. Palmer
Inventor:
Georg Martin
By Richard
his Attorneys.
THE NORRIS PETERS CO., PHOTO-LITHO., WASHINGTON, D. C.

UNITED STATES PATENT OFFICE.

GEORG MARTIN, OF BERLIN, GERMANY.

HORSESHOE.

SPECIFICATION forming part of Letters Patent No. 480,731, dated August 16, 1892.

Application filed January 9, 1892. Serial No. 417,482. (No model.) Patented in Germany March 10, 1891, No. 59,311; in Austria-Hungary June 22, 1891, No. 13,850, and in England November 28, 1891, No. 20,782.

*To all whom it may concern:*

Be it known that I, GEORG MARTIN, a subject of the Emperor of Germany, residing at Berlin, Germany, have invented certain new and useful Improvements in Horseshoes, (patented in Germany, Austria, and England,) of which the following is a full, clear, and exact description.

This invention has been patented to me in Germany March 10, 1891, No. 59,311; in Austria-Hungary June 22, 1891, No. 13,850, and No. 29,172, 1891, and in Great Britain November 28, 1891, No. 20,782.

This invention has reference to a new, easily-manipulated, and solid fastening of a pad to lie transversely over the frogs of a horseshoe, so that said pad will continuously wedge at every step of the horse, and is thus not liable to become loose. This arrangement permits of an easy removal of the pad without the necessity of taking the shoe from the hoof or experiencing other difficulty.

Figure 1 is a bottom plan of my improved shoe. Fig. 2 is a section thereof on the line A A of Fig. 1. Fig. 3 is a bottom plan of a different form of shoe. Fig. 4 is a section on the line B B of Fig. 3. Fig. 5 is a plan of another form. Fig. 6 is a section on the line C C of Fig. 5. Fig. 7 is a plan of still another form. Fig. 8 is a section on the line D D of Fig. 7. Fig. 9 is a plan of another form. Fig. 10 is a section on the line E E of Fig. 9.

Referring to the details of the drawings by letter, the complete shoe is shown with a depression extending from the point $e$ to the point $f$ on both frog ends and running to the bottom $g$ and to the outer perpendicular side $w$. The form of shoe shown in Figs. 1, 2, 3, and 4 has projections $a\ b$ and $c\ d$, which are reinforced at the bottom $g$, as shown at $x$. The depressions may assume different shapes. In Figs. 9 and 10 it is of a dovetail shape, wider at the bottom $g$ than on the walking-surface, and the walls may be either plain or toothed, being shown as toothed in Figs. 6, 8, and 10.

A hollow shoe, (so-called "rope shoe,") Figs. 5, 6, 7, and 8, has in both frogs a depression $e\ f$, the inner wall $j$ of the channel being perpendicular to the bottom $g$, the walls of said depression being also toothed, Figs. 6 and 8, or they may be smooth.

As a pad I use an elastic material, rubber, gutta-percha, leather, felt, cork, &c., which is suitably cut before being inserted in the shoe, and may be provided with notches $v$, as in Figs. 3, 4, 7, and 8.

When the pad $p$ is inserted into the shoe, Figs. 1 and 2, the rods $a$, $b$, $c$, and $d$ are hammered into the notches $v$, Figs. 3 and 4. Through the reinforcement $x$ of the rods $a$, $b$, $c$, and $d$ the gliding off from the slanting surfaces of the notches, and the consequent formation of an outward useless and objectionable loop by bending outwardly over the bottom $g$, is avoided. By this reinforcement $x$ the rods $a$, $b$, $c$, and $d$ are forcibly guided when being hammered over, and it prevents them from bending outwardly or to the front or rear in consequence of the shocks received while in use, so that the rods still accomplish their purpose, even if worn to a considerable degree. The pads $p$, which are pressed into the shoes, Figs. 5 to 10, fit tightly the toothed or smooth walls of the depression, so that it is impossible for them to fall out.

I claim—

1. A horseshoe having vertical walls $w\ w$ and a horizontal plate $g$, extending between the walls, said walls and plate forming a depression across the frog part, and a pad held in said depression, substantially as described.

2. A horseshoe having vertical walls $w\ w$ and a horizontal plate $g$, extending between the walls, said walls and plate forming a recess, a pad, and retaining means for said pad, consisting of vertical extensions on each side of the depression, substantially as described.

3. A horseshoe having depressions extending across the frog part thereof, a flexible pad, and retaining means therefor, consisting of the overhanging walls $e\ f$ on each side of the depression, substantially as described.

In witness whereof I have signed this specification in presence of two witnesses.

GEORG MARTIN.

Witnesses:
 FELIX BROKK,
 MAX LOSER.